US005489490A

United States Patent [19]
Carey, II et al.

[11] Patent Number: 5,489,490
[45] Date of Patent: *Feb. 6, 1996

[54] COATED METAL STRIP

[75] Inventors: Jay F. Carey, II, Follansbee, W. Va.; Mehrooz Zamanzadeh, Pittsburgh, Pa.

[73] Assignee: The Louis Berkman Company, Steubenville, Ohio

[ * ] Notice: The term of this patent shall not extend beyond the expiration date of Pat. No. 5,401,586.

[21] Appl. No.: 341,365

[22] Filed: Nov. 17, 1994

Related U.S. Application Data

[63] Continuation-in-part of Ser. No. 175,523, Dec. 30, 1993, Pat. No. 5,401,586, which is a continuation-in-part of Ser. No. 154,376, Nov. 17, 1993, abandoned, which is a continuation of Ser. No. 42,649, Apr. 5, 1993, abandoned.

[51] Int. Cl.$^6$ .............................. B32B 15/18; B32B 15/20
[52] U.S. Cl. .......................... 428/647; 428/648; 428/939
[58] Field of Search ................................. 428/648, 659, 428/939, 679, 685, 658, 647

[56] References Cited

U.S. PATENT DOCUMENTS

| | | | |
|---|---|---|---|
| 84,205 | 11/1868 | Mills | 428/648 |
| 1,156,169 | 10/1915 | Monnot | 428/658 |
| 1,989,925 | 2/1935 | Hoover | 148/6 |
| 2,210,593 | 11/1940 | McCullough | 75/175 |
| 2,258,327 | 10/1941 | Kramer | 29/181 |
| 2,374,926 | 5/1945 | Fink | 117/51 |
| 2,533,048 | 12/1950 | Rodgers | 117/52 |
| 2,703,766 | 3/1955 | Ellis | 117/114 |
| 2,806,622 | 9/1957 | Leirer | 220/5 |
| 3,012,310 | 12/1961 | Godfrey | 29/196.4 |
| 3,058,856 | 10/1962 | Miller | 148/16 |
| 3,231,127 | 1/1966 | Virzi | 220/52 |
| 3,630,792 | 12/1971 | Smyth | 148/6.3 |
| 3,791,801 | 2/1974 | Ariga et al. | 29/196.5 |
| 3,962,501 | 6/1976 | Ohbu et al. | 427/433 |
| 3,966,564 | 6/1976 | Hyner et al. | 204/43 |
| 4,015,950 | 4/1977 | Galland et al. | 428/648 |
| 4,049,481 | 9/1977 | Morisaki | 156/151 |
| 4,177,326 | 12/1979 | Windal et al. | 428/645 |
| 4,184,928 | 1/1980 | Hoije | 204/43 |
| 4,190,504 | 2/1980 | Usui | 204/35 |
| 4,202,921 | 5/1980 | Enghaq | 427/406 |
| 4,321,289 | 3/1982 | Bartsch | 427/287 |
| 4,357,027 | 11/1982 | Zeitlow | 280/5 |

(List continued on next page.)

FOREIGN PATENT DOCUMENTS

| | | |
|---|---|---|
| 480122 | 4/1992 | European Pat. Off. . |
| 746337 | 5/1933 | France . |
| 1457769 | 9/1966 | France . |
| 2052324 | 3/1971 | France . |
| 2281995 | 8/1974 | France . |
| 2554831 | 11/1983 | France . |
| 2554831 | 5/1985 | France . |
| 2713196 | 10/1978 | Germany . |
| 42-18219 | 9/1967 | Japan . |
| 49-54230 | 5/1974 | Japan . |
| 58-48694 | 3/1983 | Japan . |
| 59-41430 | 3/1984 | Japan . |
| 59-96238 | 6/1984 | Japan . |
| 60-208465 | 10/1985 | Japan . |
| 528558 | 10/1932 | United Kingdom . |
| 546179 | of 1942 | United Kingdom . |
| 581604 | 10/1946 | United Kingdom . |
| 796128 | 6/1958 | United Kingdom . |
| 1008316 | 10/1965 | United Kingdom . |
| 1040916 | 9/1966 | United Kingdom . |
| 1074852 | 7/1967 | United Kingdom . |
| 1178816 | 1/1970 | United Kingdom . |
| 1194751 | 6/1970 | United Kingdom . |
| 1277523 | 6/1972 | United Kingdom . |
| 1439774 | 6/1976 | United Kingdom . |
| 1513002 | 6/1978 | United Kingdom . |
| 1517454 | 7/1978 | United Kingdom . |
| 2005307 | 4/1979 | United Kingdom . |
| 1588808 | 4/1981 | United Kingdom . |
| 2099857 | 1/1982 | United Kingdom . |
| 2117414 | 10/1983 | United Kingdom . |
| 2265389 | 9/1993 | United Kingdom . |
| 2276887 | 10/1994 | United Kingdom . |

OTHER PUBLICATIONS

English Translation of Kokai Patent Application No. SHO 49 (May 1974) 54230.
"Properties and Selection: Nonferrous Alloys and Special–Purpose Materials", Metals Handbook, 10th Ed., vol. 2, pp. 1166–1168, no date.
"Tinning of Steel", Robert J. Nekervis & Bruce W. Gonser, pp. 709–711, no date.
"Zinc Coatings", W. M. Pierce, pp. 712–714, no date.
"Zinc and Zinc Alloys", Kelton, E. H., pp. 1077–1086, no date.
"Tin–Zinc Alloy Coatings", *Materials & Methods*, pp. 1248–1250, from Tin, Jul. 1946, pp. 9–10.
Metal Coatings, p. 35, McGraw–Hill Encyclopedia of Scient. & Technology Sixth Edition, vol. II, no date.
Erwin Vogelsang et al, Tin & Tin Alloys, pp. 1063–1070, American Society for Metals–Metals Handbook, no date.
Higuchi, et al, "Sn–Zn Alloy Electroplated Steel Sheet for Container of Alcohol Fuel or Alcohol–Containing Fuel", Translation of Kokai 58/48690, Mar. 1983, 11 pages.
Federal Specification QQ–T–201F, 12 Nov. 1986, "Terne Plate, for Roofing and Roofing Products" pp. 1–8.
"Hot Dip Tin Coating of Steel and Cast Iron", Metals Handbook, 9th Ed. vol. 5, 1983, pp. 351–355, no month.
Great Britain Search Report, dated May 22, 1995, for GB 9504/12.2.
Hansen, Max, Constitution of Binary Alloys, McGraw–Hill Book Co., NY, 1958, pp. 1217–1219.

*Primary Examiner*—John Zimmerman
*Attorney, Agent, or Firm*—Vickers, Daniels & Young

[57] ABSTRACT

A corrosion-resistant strip roofing material which is essentially lead free and is not highly reflective. The coating on the roofing material is a two-phase metallic coating comprised of a large weight percentage of tin and a relatively large weight percentage of zinc. The tin-zinc composition provides for both a highly corrosive-resistant coating which protects the surface of the roofing material from oxidation and also a gray surface coloring which is not highly reflective.

35 Claims, No Drawings

U.S. PATENT DOCUMENTS

| | | | |
|---|---|---|---|
| 4,758,407 | 7/1988 | Ballentine et al. | 420/560 |
| 4,778,733 | 10/1988 | Lubrano et al. | 428/647 |
| 4,806,309 | 2/1989 | Tulman | 420/561 |
| 4,814,049 | 3/1989 | Helton et al. | 204/44.2 |
| 4,819,096 | 11/1989 | Naton | 420/561 |
| 4,969,980 | 11/1990 | Yoshioka et al. | 204/28 |
| 4,999,258 | 3/1991 | Wake et al. | 428/632 |
| 5,114,799 | 5/1992 | Onashi et al. | 428/659 |
| 5,203,985 | 4/1993 | Nishimura et al. | 205/193 |
| 5,314,758 | 5/1994 | Carey, II et al. | 428/648 |
| 5,354,624 | 10/1994 | Carey, II | 428/647 |

COATED METAL STRIP

This application is a continuation-in-part of co-pending prior application Ser. No. 175,523 filed Dec. 30, 1993, now U.S. Pat. No. 5,401,586, which is in turn a continuation-in-part of abandoned Ser. No. 154,376 filed Nov. 17, 1993 which is in turn a file wrapper continuation of abandoned application Ser. No. 042,649 filed on Apr. 5, 1993.

The present invention relates to the art of metal roofing materials and more particularly to a roofing sheet material that is environmentally acceptable while providing long life and acceptable colorization.

INCORPORATION BY REFERENCE

As background material so that the specification need not specify in detail what is known in the art, Assignees' U.S. Pat. Nos. 4,987,716 and 4,934,120 illustrate metal roofing systems of the type to which this invention relates and are incorporated herein by reference. U.S. patent application Ser. No. 000,101 filed Jan. 4, 1993, now abandoned, illustrating a process of hot-dip coating roofing materials, is also incorporated herein by reference. The metallic coatings disclosed in application Ser. No. 175,523; Ser. No. 153,026, now U.S. Pat. No. 5,595,703, and Ser. No. 042,649 are also incorporated herein.

BACKGROUND OF THE INVENTION

Over the years, metal roofing systems made of pliable metals in various sheet gauge thicknesses have been used. Metals such as carbon steel, stainless steel, copper and aluminum are the most popular types of metal roofing systems. These metal roofing systems are commonly treated with corrosion-resistant coatings to prevent rapid oxidation of the metal surface, thereby extending the life of the materials. A popular corrosion-resistant coating for carbon steel and stainless steel is a terns coating. Terns coating has been the predominate and most popular coating for roofing materials due to its relatively low cost, ease of application and excellent corrosion-resistant properties. The terne coating is an alloy typically containing about 80% lead and the remainder tin. The coating is generally applied to the metal roofing materials by a hot-dip process wherein the metal roofing material is immersed into a molten bath of terne metal. Although terne coated sheet metals have exhibited excellent corrosive-resistant properties and have been used in a variety of applications, the terne metal has been questioned in relation to its impact on the environment. Environmental and public safety laws have been recently proposed and/or passed prohibiting the use of materials containing lead. Because the terne alloy contains a very high percentage of lead, materials coated with terne have been prohibited in various types of usages or applications such as aquifer roofing systems. The concern of lead possibly leaching from the terne coating has made such coated materials inadequate and/or undesirable for several types of building applications. The terne alloy has a further disadvantage in that the newly applied terne is very shiny and highly reflective. As a result, the highly-reflective coating cannot be used on buildings or roofing systems such as at airports and military establishments. The terne coating eventually loses its highly-reflective properties as the components within the terne coating are reduced; however, the desired amount of reduction takes approximately 1½ to 2 years when the terne coating is exposed to the atmosphere, thus requiring the terne metals to be stored over long periods of time prior to being used in these special areas. The storage time is significantly prolonged if the terne-coated materials are stored in rolls and the rolls are protected from the atmosphere.

Tin coating of carbon steel is a well-known process for use in the food industry. However, in the specialized art of roofing, a tin coating for metal roofing materials has not been used until done by the present inventors. The most popular process for applying a tin coating to carbon steel for use in the food industry is by an electrolysis process. In an electrolysis process, the coating thickness is very thin and typically ranges between $3.8 \times 10^{-4}$ to $20.7 \times 10^{-4}$ mm ($1.5 \times 10^{-5}$ to $8.15 \times 10^{-5}$ in.). Furthermore, the equipment and materials needed to properly electroplate the metal materials are very expensive and relatively complex to use. The expense of applying an electroplated-tin coating and the limited obtainable thicknesses of the tin coating are a disadvantage for using such a process for building and roofing materials. A hot-dip process for applying the tin coating may be used; however, if the roofing materials are not properly prepared and the coating is not properly applied to the roofing materials, minute areas of discontinuity in the tin coating may occur resulting in non-uniform corrosion protection. This is especially a problem when the tin is applied to stainless steel materials by a hot-dip process. Tin is not electroprotective to steel under oxidizing conditions. Consequently, discontinuities in the tin coating result in the corrosion of the exposed metal. Tin coatings have the further disadvantage of having a highly-reflective surface. As a result, building materials coated with a tin coating cannot be used in an environment where highly-reflective materials are undesirable until the coated materials are further treated (i.e. painted) or the tin is allowed time to oxidize.

Coating building materials with zinc metal, commonly known as galvanization, is another popular metal treatment to inhibit corrosion. Zinc is a highly desirable metal to coat building materials with because of its relatively low cost, ease of application (i.e. hot-dip application) and excellent corrosion resistance. Zinc is also electroprotective to steel under oxidizing conditions and prevents the exposed metal, due to discontinuities in the zinc coating, from corroding. This electrolytic protection extends away from the zinc coating over exposed metal surfaces for a sufficient distance to protect the exposed metal at cut edges, scratches, and other coating discontinuities. With all of the advantages of using zinc, zinc coatings have several disadvantages that make it undesirable for many types of building applications. Although zinc coatings will bond to many types of metals, the formed bond is not strong and can result in the zinc coating flaking off the building materials. Zinc is also a very rigid and brittle metal and tends to crack and/or flake off when the building materials are formed on site, i.e. press fitting of roofing materials.

Due to the various environmental concerns and problems associated with corrosion-resistant coatings applied to metal roofing materials, there has been a demand for a coating which can be easily and successfully applied to roofing materials that protects the roofing materials from corrosion, does not have a highly-reflective surface subsequent to application and allows the materials to be formed at the building site.

SUMMARY OF THE INVENTION

The present invention relates to a corrosion-resistant coating formulation for use on roofing materials wherein the coating does not have a highly-reflective surface after being applied to the roofing materials.

In accordance with the principal feature of the invention, there is provided a roofing material typically of stainless steel, carbon steel, copper and bronze coated with a tin-zinc alloy. The tin-zinc coating is a two-phase metal coating comprising a large weight percentage of tin and a relatively large weight percentage of zinc. The tin content of the two-phase coating is at least 70% and the zinc content is at least 7 weight percent. The unique tin-zinc combination provides for both a corrosion-resistant coating that protects the surface of the roofing material from oxidation and also has a gray surface which is not highly reflective.

In accordance with another aspect of the present invention, the tin-zinc coating is applied to the metal roofing materials by a hot-dip process. If the tin-zinc coating is to be applied to stainless steel roofing materials, the coating is preferably applied to the roofing materials in similar fashion as disclosed in Assignees' application Ser. No. 000,101 filed on Jan. 4, 1993 and incorporated herein. The hot-dip process disclosed in Ser. No. 000,101 can be used to coat building materials made of metals other than stainless steel such as carbon steel, aluminum, copper, bronze, etc.

In accordance with another aspect of the invention, bismuth and antimony may be added to the tin-zinc coating to inhibit the crystallization of the tin in cold weather. When tin crystallizes, the bonding of the tin-zinc coating to the roofing materials may weaken resulting in flaking of the coating. The addition of small amounts of bismuth and/or antimony prevents such crystallization of the tin. Bismuth or zinc may be added in larger quantities to also enhance the hardness and strength of the tin-zinc coating to increase the resistance to wear of the coating.

In accordance with another feature of the present invention, the tin-zinc coating is essentially lead free. The lead content is maintained at extremely low levels not exceeding 0.05 weight percent. Preferably, the lead content is maintained at much lower weight percentage levels so as to dispense with any environmental concerns associated with the tin-zinc coating.

In accordance with yet another feature of the present invention, the tin-zinc coating composition is such that the coating provides excellent corrosion resistance and the coated materials can be formed on site without the tin-zinc coating cracking and/or flaking off. The amount of zinc in the tin-zinc coating is controlled such that the coating does not become too rigid and brittle. In the preferred embodiment, zinc is maintained at levels below 30 weight percent. Zinc concentrations exceeding 30 weight percent can cause the tin-zinc coating to become too rigid and/or brittle for certain types of applications such as the press fitting of roofing materials. Tin is a relatively malleable metal and weight percentages of 70 or more significantly contribute to the malleable properties of the tin-zinc coating.

In accordance with still another aspect of the present invention, the metallic roofing materials are plated with a nickel barrier prior to applying the tin-zinc coating to provide additional corrosion resistance, especially against halogens such as chlorine. The nickel barrier is applied to the metal building materials at a thin layer which preferably does not exceed 3 microns in thickness. In the preferred embodiment, the nickel barrier is applied by an electrolysis process. The nickel barrier provides an additional barrier against various elements and compounds which attack, oxidize and weaken the metal building materials. Although the tin-zinc coating provides excellent protection against most of these corrosion-producing elements and compounds, compounds such as chlorine have the ability to eventually penetrate the tin-zinc coating and attack and oxidize the surface of the metallic building materials thereby weakening the bond between the roofing material and the tin-zinc coating. The nickel barrier has been found to provide an almost impenetrable barrier to these elements and/or compounds which in fact penetrate the tin-zinc coating. Due to the very small amount of these compounds penetrating the tin-zinc coating, the thickness of the nickel barrier can be maintained at thin thicknesses while still maintaining the ability to prevent these components from attacking the metal roofing material. The tin-zinc coating and thin nickel coating effectively complement one another to provide superior corrosion resistance.

The primary object of the present invention is the provision of a roofing material coated with a metallic coating which is highly corrosive resistant.

Another object of the present invention is the provision of a roofing material treated with a metallic coating that is not highly reflective.

Yet another object of the present invention is a metallic coating, as defined above, which is a two-phase system comprised of tin and zinc.

Still yet another object of the present invention is the provision of a roofing material treated with a tin-zinc metallic coating comprising at least 70% tin and at least 7% zinc by weight.

Yet another object of the present invention is the provision of a roofing material having a tin-zinc metallic coating which is essentially lead free.

Yet another object of the present invention is a metallic tin-zinc coating, as defined above, containing antimony and/or bismuth to inhibit the crystallization of the tin.

Still yet another object of the present invention is to provide a two-phase, tin-zinc metallic coating applied to a base metal sheet which coated sheet can be formed and sheared to form various building and roofing components that can be subsequently assembled on site without the metallic coating flaking off, chipping, and/or cracking.

Still another object of the present invention is the provision of providing a tin-zinc coated roofing material which can be preformed into roof pans and subsequently seamed on site either by pressed seams or soldered seams into waterproof joints.

Another object of the present invention is the provision of applying a thin nickel barrier to the surface of the roofing material prior to applying the tin-zinc coating.

These and other objects and advantages will become apparent to those skilled in the art upon reading of the detailed description of the invention set forth below.

DESCRIPTION OF THE PREFERRED EMBODIMENT

The tin-zinc coating is a two-phase metallic coating which, when applied to stainless steel or low carbon steel materials, forms a highly corrosion-resistant coating that reduces the corrosion of the materials when exposed to the atmosphere. The tin-zinc coating contains a large weight percentage of tin and a moderate amount of zinc. It has been discovered that by adding zinc in the amounts of at least 7 weight percent of the tin-zinc alloy, the corrosion resistance of the two-phase metallic coating is significantly increased as compared to a protective coating essentially composed of tin. Although the exact reasons for this physical phenomenon of increased corrosion resistance due to the addition of zinc to tin is unknown to the inventors, it has been found that by maintaining the zinc content between 7 and 30% of the tin-zinc alloy, the two-phase metallic coating exhibits corrosive-resistant properties which exceed that of tin coatings and, in some environments, that of a terns coating. The tin-zinc coating is electroprotective under oxidizing conditions which inhibits oxidation of exposed metal near the tin-zinc coating. As a result, minor discontinuities in the tin-zinc coating do not result in oxidation of the exposed metal, a contrary result if only a tin coating is used. The tin-zinc coating may contain small amounts of other metals to modify the physical properties of the tin-zinc, two-phase metallic coating; however, these secondary metal components contribute primarily to the strength of the coating and not to the corrosion-resistant properties of the coating. The tin-zinc coating can be applied to both stainless steel and carbon steel materials by preferably using a conventional hot-dipping process; however, the coating may be applied by other means such as by electroplating, an airknife process, etc. The tin-zinc coating is not limited to only the protection of stainless steel and carbon steel and may also be applied to other metals such as copper, bronze, tin, titanium, etc. Although the tin-zinc coating is designed to be a coating for roofing materials, any type of metallic building material can be coated by the tin-zinc coating to provide added corrosion resistance.

The large zinc content of the two-phase metallic tin-zinc coating has not been previously used, especially on metallic building and roofing materials. The bonding of the tin-zinc coating to carbon steel and stainless steel roofing materials is surprisingly strong and forms a durable protective coating which is not easily removable, thereby resisting flaking of the coating. The surfaces of the metallic roofing and building materials may be pretreated prior to the coating to improve the bonding between the tin-zinc coating and the surface of the metallic roofing material. For stainless steel materials, pickling the surface of the stainless steel provides for significantly greater bonding of the coating. Preferably, the pickling process disclosed in Assignees' application Ser. No. 000,101 is used to maximize the bonding of the tin-zinc coating to the stainless steel materials.

The amount of corrosion-resistance protection provided by the tin-zinc, two-phase metallic coating is one of the primary concerns for a metallic roofing system. Roofing materials such as carbon steel readily oxidize and corrode in the presence of standard atmospheric conditions. As the metallic roofing material corrodes, it begins to disintegrate and structurally weaken. The life of the metallic roofing material is significantly extended by coating the roofing material with the tin-zinc metallic coating. The tin-zinc coating acts as a barrier to the atmosphere which prevents the metallic coating from oxidizing and/or reducing in the presence of oxygen, carbon dioxide or other reducing agents in the environment. Although the tin-zinc coating will eventually oxidize in the presence of various reducing agents in the atmosphere, the rate of oxidation is significantly slower than that of the metallic roofing or building materials. Furthermore, the tin and zinc oxide which forms on the coating surface provides corrosion resistance to the tin-zinc coating itself which further enhances the corrosion protection provided by the tin-zinc coating. The tin-zinc oxides also further reduce the reflectivity of the tin-zinc coating. By coating the building materials with the tin-zinc coating, the life of said materials is extended typically beyond the usable life of the structure the coated materials are used on.

The tin-zinc coating is primarily composed of tin and zinc and contains little, if any, lead thus making the coating essentially lead free. The lead content is maintained at extremely low levels within the metallic coating. The amount of lead in the tin-zinc coating is maintained such that no more than 0.05 weight percent is present in the coating. Preferably, the lead content in the coating is maintained at levels less than 0.01 weight percent. The essential absence of lead from the metallic coating eliminates any concerns associated with the leaching of the lead from the metallic coating and the environmental concerns associated with products containing lead. The elimination of concerns associated with the lead vastly expand the potential uses of roofing materials coated with the tin-zinc coating. A particularly desirable use for tin-zinc coated materials is to form roofing materials out of such coated materials for the collection of potable water. In addition, the concern for potential lead contamination in the potable water is eliminated due to the extremely low levels of lead within the metallic coating. The stability of the tin-zinc, two-phase coating is such that only very small amounts of zinc or tin ions transfer to the water in a potable water system. As a result, discoloration and metallic aftertaste of the potable water are essentially non-existent making the tin-zinc coating highly desirable for such applications.

The tin-zinc metallic coating is a two-phase system which contains a relatively large weight percentage of tin. Preferably, the tin weight percentage is at least 70% and can be as much as 93% of the tin-zinc coating. The zinc content within the metallic coating is also a relatively large weight percentage of the metallic coating. The zinc content ranges between 7–30 weight percent of the tin-zinc metallic coating. The tin-zinc system forms a two-phase metallic coating. A two-phase system is defined as a metal alloy comprising two primary components. In the present metallic coating, the tin and zinc are the two primary components that make up the two-phase system. Historically, it has been believed that two-phase systems provide less corrosion-resistance protection than single-phase systems. This belief is partially derived from the fact that in a two-phase system the bonding between the different types of metals is irregular and sometimes weaker, thereby allowing various elements and molecules to more easily penetrate the coating than as compared to a protective coating composed of primarily a single component. Surprisingly, the inventors have found that the tin-zinc coating provides a protective coating with a higher corrosion resistance as compared to a tin coating primarily made up of tin. The amount of zinc within the metallic coating is maintained so as not to exceed 30% so that the metallic coating remains relatively pliable for use in a press-fit roofing system. Zinc in excess of 30 weight percent begins to make the metallic coating rigid and brittle which can result in the metallic coating cracking when being bent or formed such as in a press-fit roofing system. Preferably, the zinc content of the tin-zinc coating ranges between 7–20 weight percent of the coating.

The tin-zinc metallic coating may also contain small amounts of other metallic components which can be used to slightly modify the physical properties of the metallic coating. The metallic coating may contain bismuth and antimony to increase the strength of the metallic coating and also to inhibit the crystallization of the tin at lower temperatures. The amount of bismuth in the metallic coating may range between 0–1.7 weight percent and the amount of antimony may range between 0–7.5 weight percent of the coating. Preferably, antimony and/or bismuth are added to the metallic coating in an amount of up to about 0.5 weight percent of the coating. Metallic stabilizer in amounts of at least about 0.01 weight percent have been found to advantageously affect the crystalling properties of the coating. This weight percentage amount is sufficient to prevent the tin from crystallizing at low temperatures which may result in the metallic coating flaking off the metallic roofing materials. Antimony and/or bismuth in weight percentages greater than 0.5% are primarily added to harden and/or strengthen the metallic coating. Small amounts of other metals, such as iron or copper, may be added to the metallic coating to strengthen and/or increase the pliability of the metallic coating. These other types of metals typically constitute very small weight percentages within the metallic coating and generally do not exceed more than 2% of the metallic coating and preferably are less than 1% of the metallic coating.

The tin-zinc coating is a dull gray coating. The dull gray surface is much less reflective than that of coatings of tin and/or terne. The reduced reflective surface of the tin-zinc coating is important in that the coated building materials can be immediately used on facilities that require materials not to be highly reflective. Prior coatings such as tin and/or terne had to be weathered and/or additionally treated before such coated building materials could be used on facilities which prohibit the use of highly-reflective materials. The oxidation of the tin-zinc coating further dulls the surface of the metallic coating which results in a further reduction of reflectivity of the metal surface.

In an alternative embodiment, the metallic roofing material is plated with a nickel barrier prior to applying the tin-zinc coating. In a highly-acidic environment, it has been found that the corrosion resistance of the tin-zinc coating can be significantly improved by applying a thin layer of nickel between the tin-zinc coating and the metallic roofing material. The nickel barrier is preferably plated to the metallic building material by an electrolysis process. The thickness of the barrier is maintained such that it is not more than 3 microns ($1.18 \times 10^{-4}$ in.) and preferably ranges between 1–3 microns. Once the nickel barrier is applied, the tin-zinc coating is then applied onto the nickel coating. The bond between the tin-zinc coating and the nickel barrier is surprisingly strong and durable and thereby inhibits the tin-zinc coating from flaking especially when the building materials are preformed or formed during installation. The plating of the building materials with the thin nickel barrier is very desirable when the building materials are used in an environment which has high concentrations of fluorine, chlorine and other halogens. Although the tin-zinc coating significantly reduces the corrosive effects of halogens on the metallic building materials, the inventors have found that by placing a thin layer of plated nickel between the metallic building material and the tin-zinc coating, the corrosive effects of the halogens are even further reduced.

Examples of the tin-zinc, two-phase metallic coating which have exhibited the desired characteristics as mentioned above are set forth as follows:

| Alloy Ingredients | A | B | C | D | E |
|---|---|---|---|---|---|
| Zinc | 7 | 10 | 15 | 20 | 20 |
| Antimony | — | 0.5–7.5 | 0.5 | — | 0.5 |
| Bismuth | 0.5–1.7 | — | — | 0.5 | — |
| Lead | ≦0.05 | ≦0.05 | ≦0.05 | ≦0.05 | ≦0.05 |
| Iron | ≦0.1 | ≦0.1 | ≦0.1 | ≦0.1 | ≦0.1 |
| Copper | ≦2.0 | ≦2.0 | ≦2.0 | ≦2.0 | ≦2.0 |
| Tin | Bal | Bal | Bal | Bal | Bal |

Generally, the formulations of the tin-zinc metallic coating include in weight percentage amounts; 7–20% zinc, 0–2.5% antimony, 0–0.5% bismuth, and the remainder tin.

The thickness of the tin-zinc coating may be varied depending upon the environment in which the building materials are to be used. The tin-zinc coating exhibits superior corrosive-resistant properties as compared to tin coatings. The metallic coating may be applied in a thickness between 0.001–0.2 in. Preferably, the coating thickness is applied by a hot-dip process and ranges between 0.001–0.002 in. Such a coating thickness has been found to be adequate to prevent and/or significantly reduce the corrosion of the metallic building materials in virtually all types of environments. Coatings having thicknesses greater than 0.002 can be used in harsh environments to provide added corrosion protection.

The tin-zinc coating can be welded with standard lead solders and no-lead solders. Preferably, no-lead solders are used to avoid concerns associated with the use of lead.

The invention has been described with reference to the preferred and alternate embodiments. Modifications and alterations will become apparent to those skilled in the art upon the reading and understanding of the details discussed in the detailed discussion of the invention provided for herein. This invention is intended to include all such modifications and alterations insofar as they come within the scope of the present invention.

We claim:

1. A coated metal strip including a base strip of steel or copper with parallel surfaces both of which are coated with a highly corrosive-resistant, homogeneous two-phase tin-zinc alloy with tin being the primary constituent and zinc forming one of said two-phases, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.003 inch, said two-phase tin-zinc alloy coating comprising discrete sections of zinc in a tin rich matrix, said two-phases being formed by proportioning the zinc and tin to provide about 10 to about 30 percent by weight zinc, a majority of tin and an effective amount of metallic stabilizer, which metallic stabilizer does not change the two-phase characteristic of said coating alloy deposited on the moving strip and is selected from the group consisting of antimony, bismuth and mixtures thereof.

2. A coated metal strip as defined in claim 1, wherein said two-phase coating comprises:

| Tin | [more than 70%] 70–90% |
|---|---|
| Zinc | [up to 30%] 10–30% |
| Antimony | more than 0.01% |

3. A coated metal strip as defined in claim 1, wherein said two-phase coating comprises:

| Tin | [more than 70%] 70–90% |
|---|---|
| Zinc | [up to - 30%] 10–30% |
| Bismuth | 0.01–1.7% |

4. A coated metal strip as defined in claim 1, wherein said two-phase coating comprises:

| Tin | [more than 70%] 70–90% |
|---|---|
| Zinc | [up to - 30%] 10–30% |
| Iron | 0.1–2.0% |

5. A coated metal strip as defined in claim 1, wherein said two-phase coating comprises:

| | | |
|---|---|---|
| Tin | [more than 70%] | 70–90% |
| Zinc | [up to - 30%] | 10–30% |
| Copper | | 0.1–2.0% |

6. A coated metal strip as defined in claim 1, wherein said base metal strip is plated with a thin nickel layer prior to applying said two-phase metallic coating.

7. A coated metal strip as defined in claim 6, wherein said nickel layer thickness ranges between 0.0001 to 0.003 inches.

8. A coated metal strip as defined in claim 6, wherein said nickel layer is electroplated onto said steel sheet.

9. A coated metal strip as defined in claim 1, wherein said two-phase coating alloy includes lead.

10. A coated metal metal strip as defined in claim 9, wherein said lead is less than 0.01 percent by weight.

11. A coated metal strip as defined in claim 1 including additional non-phase affecting metal selected from the group consisting of antimony, bismuth, copper, iron, lead and mixtures thereof.

12. A coated metal strip including a base strip of stainless steel with parallel surfaces both of which are coated with a highly corrosive-resistant, homogeneous two-phase tin-zinc alloy including about 10–30 weight percent zinc, a majority of tin and an effective amount of metallic stabilizer selected from the group consisting of antimony, bismuth and mixtures thereof, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.003 inch, said two-phase tin-zinc alloy coating comprising discrete sections of zinc in a tin rich matrix.

13. A coated metal strip as defined in claim 12, wherein said base metal strip is plated with a thin nickel layer prior to applying said two-phase metallic coating.

14. A coated metal strip as defined in claim 13, wherein said nickel layer thickness ranges between 0.0001 to 0.003 inches.

15. A coated metal strip as defined in claim 13, wherein said nickel layer is electroplated onto said steel sheet.

16. A coated metal metal strip as defined in claim 12, wherein said two-phase coating alloy includes lead.

17. A coated metal strip including a base strip of steel or copper with parallel surfaces both of which are coated with a highly corrosive-resistant, homogeneous two-phase tin-zinc alloy including about 10–30 weight percent zinc and a majority of tin, said coating being applied by continuously passing the continuous metal strip through a bath of molten tin-zinc alloy at a speed to deposit onto said base strip an impervious two-phase layer of said tin-zinc alloy having a uniform thickness on both surfaces in the range of 0.001–0.003 inch, said two-phase tin-zinc alloy coating comprising discrete sections of zinc in a tin rich matrix and an effective amount of metallic stabilizer selected from the group consisting of antimony, bismuth and mixtures thereof, wherein said base strip is plated with a thin layer of metal prior to applying said two-phase metallic coating.

18. A coated steel strip as defined in claim 17, wherein said thin layer is nickel.

19. A coated metal strip as defined in claim 17, wherein said thin layer of metal thickness ranges between 0.0001 to 0.003 inches.

20. A coated metal strip as defined in claim 17, wherein said layer is electroplated onto said steel sheet.

21. A coated metal strip as defined in claim 17, wherein said two-phase coating alloy includes lead.

22. A coated metal strip as defined in claim 17, wherein said steel is stainless steel.

23. A coated metal strip including a base strip with surfaces coated with a homogeneous two-phase tin-zinc alloy comprising discrete sections of zinc in a tin rich matrix, said two-phases being formed from a majority of tin, about 10–30 weight percent zinc, and an effective amount of metal stabilizer selected from the group consisting of antimony, bismuth and mixtures thereof, said coating being applied by continuously passing a continuous strip said base strip through a bath of molten tin-zinc alloy at a speed to deposit onto said strip an impervious two-phase layer of tin-zinc alloy having an essentially uniform thickness.

24. A coated metal strip as defined in claim 23, wherein said base strip is selected from the group consisting of carbon steel, stainless steel, copper and bronze.

25. A coated metal strip as defined in claim 24, wherein each metal in said metal additive does not exceed 7.5 weight percent of said metal additive.

26. A coated metal strip as defined in claim 25, wherein said base strip is coated with a thin layer of metal prior to applying said hot dip tin-zinc alloy, said thin layer of metal having a thickness of 1 to 3 microns.

27. A coated metal strip as defined in claim 23, wherein said tin-zinc alloy includes a metal additive is selected from the group consisting of antimony, bismuth, copper, iron, lead and mixtures thereof.

28. A coated metal strip as defined in claim 27, wherein said metal additive contains less than 0.05 weight percent lead.

29. A coated metal strip as defined in claim 28, wherein each metal in said metal additive does not exceed 7.5 weight percent of said metal additive.

30. A coated metal strip as defined in claim 29, wherein said base strip is coated with a thin layer of metal prior to applying said hot dip tin-zinc alloy, said thin layer of metal having a thickness of 1 to 3 microns.

31. A coated metal strip as defined in claim 28, wherein said base strip is coated with a thin layer of metal prior to applying said hot dip tin-zinc alloy, said thin layer of metal having a thickness of 1 to 3 microns.

32. A coated metal strip as defined in claim 27, wherein each metal in said metal additive does not exceed 7.5 weight percent of said metal additive.

33. A coated metal strip as defined in claim 32, wherein said base strip is coated with a thin layer of metal prior to applying said hot dip tin-zinc alloy, said thin layer of metal having a thickness of 1 to 3 microns.

34. A coated metal strip as defined in claim 28, wherein said base strip is coated with a thin layer of metal prior to applying said hot dip tin-zinc alloy, said thin layer of metal having a thickness of 1 to 3 microns.

35. A coated metal strip as defined in claim 23, wherein said base strip is coated with a thin layer of metal prior to applying said hot dip tin-zinc alloy, said thin layer of metal having a thickness of 1 to 3 microns.

\* \* \* \* \*

Disclaimer 5,489,490 - Jay F. Carey, II, Follansbee, W. Va; Mehrooz Zamanzadeh, Pittsburgh, Pa. COATED METAL STRIP. Patent dated Feb. 6, 1996. Disclaimer filed Oct. 26, 1998, by the assignee, The Louis Berkman Company.

The term of this patent shall not extend beyond the expiration date of Pat. Nos. 5,429,882 and 5,401,586.

*(Official Gazette,* June 1, 1999)

Disclaimer 5,489,490—Jay F. Carey, II, Follansbee, W. Va.; Mehrooz Zamanzadeh, Pittsburgh, Pa. COATED METAL STRIP. Patent dated February 6, 1996. Disclaimer filed by the assignee, The Louis Berkman Company.

The term of this patent shall not extend beyond the expiration date of Pat. Nos. 5,429,882 and 5,470,667.
*(Official Gazette, August 27, 2002)*

UNITED STATES PATENT AND TRADEMARK OFFICE
CERTIFICATE OF CORRECTION

PATENT NO.    : 5,489,490
DATED         : February 6, 1996
INVENTOR(S)   : Carey, II et al.

It is certified that error appears in the above-identified patent and that said Letters Patent is hereby corrected as shown below:

Title page,
Delete Item [63] and substitute therefor: -- Continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned.

Continuation-in-part of Ser. No. 08/260,333, Jun. 15, 1994, Pat. No. 5,429,882, which is a continuation-in-part of Ser. No. 08/209,400, Mar. 14, 1994, abandoned, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abondoned. --

Column 1,
Line 8, after "Apr. 5, 1993." add the following:

-- This patent application is also a continuation-in-part of co-pending United States Serial No. 08/260,333 filed June 15, 1994, now United States Patent No. 5,429,882, which in turn is a continuation-in-part of United States Serial No. 08/209,400 filed March 14, 1994, now abandoned, which in turn is a continuation-in-part of United States Serial No. 08/175,523, filed December 30, 1993, now United States Patent No. 5,401,586, which in turn is a continuation-in-part of United States Serial No. 08/154,376 filed November 17, 1993, now abandoned, which in turn is a continuation of United States Serial No. 08/042,649 filed April 5, 1993, now abandoned. --

Signed and Sealed this

Eighteenth Day of February, 2003

JAMES E. ROGAN
*Director of the United States Patent and Trademark Office*